United States Patent
Lee et al.

(10) Patent No.: US 9,069,217 B2
(45) Date of Patent: Jun. 30, 2015

(54) DISPLAY PANEL AND METHOD FOR MANUFACTURING THE SAME

(71) Applicant: SAMSUNG DISPLAY CO., LTD., Yongin, Gyeonggi-Do (KR)

(72) Inventors: Gak-Seok Lee, Cheonan-si (KR); Keun-Chan Oh, Cheonan-si (KR); Taek-Joon Lee, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 178 days.

(21) Appl. No.: 13/748,699

(22) Filed: Jan. 24, 2013

(65) Prior Publication Data
US 2014/0063428 A1    Mar. 6, 2014

(30) Foreign Application Priority Data
Sep. 5, 2012   (KR) .................. 10-2012-0098271

(51) Int. Cl.
*G02F 1/1343*    (2006.01)
*G02F 1/1333*    (2006.01)
*G02F 1/1337*    (2006.01)

(52) U.S. Cl.
CPC .......... *G02F 1/13439* (2013.01); *G02F 1/1333* (2013.01); *G02F 1/133753* (2013.01); *G02F 1/134309* (2013.01); *G02F 2001/134345* (2013.01)

(58) Field of Classification Search
CPC ............................. G02F 1/1333; G02F 1/13439
USPC ................. 349/139, 93, 88, 134, 129; 445/24
See application file for complete search history.

(56) References Cited

U.S. PATENT DOCUMENTS

| | | | |
|---|---|---|---|
| 5,726,727 A * | 3/1998 | Shibahara et al. ............. 349/144 |
| 6,567,144 B1 * | 5/2003 | Kim et al. ...................... 349/128 |
| 2004/0080697 A1 * | 4/2004 | Song et al. ..................... 349/130 |
| 2008/0266480 A1 * | 10/2008 | Lee ................................ 349/48 |
| 2009/0002588 A1 * | 1/2009 | Lee et al. ........................ 349/42 |
| 2009/0009449 A1 * | 1/2009 | Uchida et al. ................... 345/87 |
| 2010/0007808 A1 | 1/2010 | Choi et al. |
| 2010/0149475 A1 * | 6/2010 | Kim et al. ...................... 349/123 |
| 2011/0037932 A1 | 2/2011 | Takahashi |
| 2011/0317119 A1 * | 12/2011 | Jung et al. ..................... 349/143 |
| 2012/0162559 A1 * | 6/2012 | Kim et al. ........................ 349/42 |
| 2013/0278877 A1 * | 10/2013 | Kwon et al. ................... 349/123 |
| 2014/0220847 A1 * | 8/2014 | Wang .............................. 445/24 |

FOREIGN PATENT DOCUMENTS

| | | | |
|---|---|---|---|
| JP | 2011-085738 A | 4/2011 | |
| JP | 2011-221400 * | 11/2011 | ............ G02F 1/1343 |
| JP | 2011-221400 A | 11/2011 | |

\* cited by examiner

*Primary Examiner* — Ed Glick
*Assistant Examiner* — Sang V Nguyen
(74) *Attorney, Agent, or Firm* — Cantor Colburn LLP

(57) ABSTRACT

A display panel includes a first substrate including a common electrode, a second substrate including a first solid pixel electrode and a second solid pixel electrode, and a liquid crystal layer including liquid crystal between the first substrate and the second substrate. The second solid pixel electrode is spaced apart from the first solid pixel electrode, and surrounds the first solid pixel electrode.

19 Claims, 14 Drawing Sheets

DISPLAY PANEL AND METHOD FOR MANUFACTURING THE SAME

This application claims priority to Korean Patent Application No. 10-2012-0098271, filed on Sep. 5, 2012, and all the benefits accruing therefrom under 35 U.S.C. §119, the contents of which are incorporated by reference herein in their entireties.

BACKGROUND

1. Field

Exemplary embodiments of the invention relate to a display panel and a method of manufacturing the display panel.

More particularly, one or more exemplary embodiment of the invention relates to a display panel capable of improving a display quality, and a method of manufacturing the display panel 2. Description of the Related Art A liquid crystal display apparatus changes an arrangement of liquid crystal using an electric field. Accordingly, transmittance of the liquid crystal is controlled to display an image. Thus, the liquid crystal display apparatus controls the electric field to display the image.

A common electrode and a pixel electrode of the liquid crystal display apparatus form the electric field. For example, a liquid crystal layer including the liquid crystal is disposed between the common electrode and the pixel electrode. Specific voltages are applied to the common electrode and the pixel electrode to form the electric field, so that the electric field changes the arrangement of the liquid crystal.

A liquid crystal display apparatus has been developed to include a pixel electrode having a slit pattern. The pixel electrode having the slit pattern is substantially the same as a plurality of electrodes each having a narrow width and spaced apart from an adjacent electrode by a specific gap. The gap between adjacent electrodes may influence formation of the electric field.

During a manufacturing process, a non-uniform gap between the adjacent electrodes may be formed, so that a non-uniform electric field may be undesirably formed with the common electrode. Accordingly, the image displayed on a liquid crystal display apparatus having the non-uniform electric field may undesirably include a non-uniform brightness, such as due to bright spots, and a decrease in display quality. Therefore, there remains a need for an improved display apparatus having a uniform electric field even if a process error occurs in manufacturing the electrodes of the display apparatus.

SUMMARY

One or more exemplary embodiment of the invention provides a display panel unaffected by an error of a pixel gap, and a method of manufacturing the display panel.

According to an exemplary embodiment of the invention, a display panel includes a first substrate including a common electrode, a second substrate including a first solid pixel electrode and a second solid pixel electrode, and a liquid crystal layer disposed between the first substrate and the second substrate. The second solid pixel electrode is spaced apart from the first solid pixel electrode, and surrounds the first solid pixel electrode.

In an exemplary embodiment, the first solid pixel electrode may include a substantially rhombus-shaped body portion.

In an exemplary embodiment, the first solid pixel electrode may be symmetric with respect to a center of the first solid pixel electrode.

In an exemplary embodiment, the first solid pixel electrode may further include a plurality of extension portions respectively extending from an apex of the rhombus-shaped body portion.

In an exemplary embodiment, the extension portions may be symmetric with respect to a center of the first solid pixel electrode.

In an exemplary embodiment, the first solid pixel electrode may include four extension portions.

In an exemplary embodiment, the first solid pixel electrode may further include a central controlling portion disposed at a center of the first solid pixel electrode.

In an exemplary embodiment, the central controlling portion may be an opening defined in the first solid pixel electrode, at the center of the first solid pixel electrode.

In an exemplary embodiment, the second solid pixel electrode may include a peripheral controlling portion which extends along an edge of the second solid pixel electrode.

In an exemplary embodiment, the peripheral controlling portion may be an opening defined in the second solid pixel electrode and extended along the edge of the second solid pixel electrode.

In an exemplary embodiment, the first solid pixel electrode and the second solid pixel electrode may be in a same layer of the display panel.

In an exemplary embodiment, a pre-tilt of the liquid crystal on the first solid pixel electrode and a pre-tilt of the liquid crystal on the second solid pixel electrode may be different from each other.

According to an exemplary embodiment of the invention, a method of manufacturing a display panel includes providing a common electrode on a first substrate, providing a unit pixel including a first solid pixel electrode and a second solid pixel electrode on a second substrate, providing a liquid crystal layer including liquid crystal between the first substrate and the second substrate, and providing a pre-tilt of the liquid crystal. The second solid pixel electrode is spaced apart from the first solid pixel electrode, and surrounds the first solid pixel electrode.

In an exemplary embodiment, the pre-tilt of the liquid crystal on the first solid pixel electrode and the pre-tilt of the liquid crystal on the second solid pixel electrode may be different from each other.

In an exemplary embodiment, the providing a pre-tilt of the liquid crystal may include providing a first pre-tilt of the liquid crystal which is disposed on the first solid pixel electrode, and providing a second pre-tilt of the liquid crystal which is disposed on the second solid pixel electrode.

In an exemplary embodiment, the providing a second pre-tilt may be after the providing a first pre-tilt.

In an exemplary embodiment, the providing a first pre-tilt and the providing a second pre-tilt may include a photoreaction.

In an exemplary embodiment, the providing forming a first pre-tilt may include applying a first voltage to the first solid pixel electrode.

In an exemplary embodiment, the providing a second pre-tilt may include applying a second voltage to the second solid pixel electrode, and the second voltage may be lower than the first voltage.

In an exemplary embodiment, the first solid pixel electrode may include a substantially rhombus-shaped body portion.

In an exemplary embodiment, the first solid pixel electrode may further include a plurality of extension portions respectively extending from an apex of the rhombus-shaped body portion.

In an exemplary embodiment, the first solid pixel electrode may further include a central controlling portion disposed at a center of the first solid pixel electrode. The central controlling portion may be an opening defined in the first solid pixel electrode.

In an exemplary embodiment, the second solid pixel electrode may further include a peripheral controlling portion which extends along an edge of the second solid pixel electrode. The peripheral controlling portion may be an opening defined in the second solid pixel electrode.

According to one or more exemplary embodiment of the invention, liquid crystal is arranged by an electric field between a common electrode and a first solid pixel electrode, an electric field between the common electrode and a second solid pixel electrode, and an electric field between the first solid pixel electrode and the second solid pixel electrode. Thus, although an error in a pixel gap between the first solid pixel electrode and the second solid pixel electrode may occur, a transmittance of the liquid crystal may not be influenced by the error. Therefore, a display quality of a display panel according to one or more exemplary embodiment of the invention may be improved in comparison with a conventional display panel having a slit structure pixel electrode.

BRIEF DESCRIPTION OF THE DRAWINGS

The above and other features of the invention will become more apparent by describing in detail exemplary embodiments thereof with reference to the accompanying drawings, in which.

DETAILED DESCRIPTION

Figure 1:
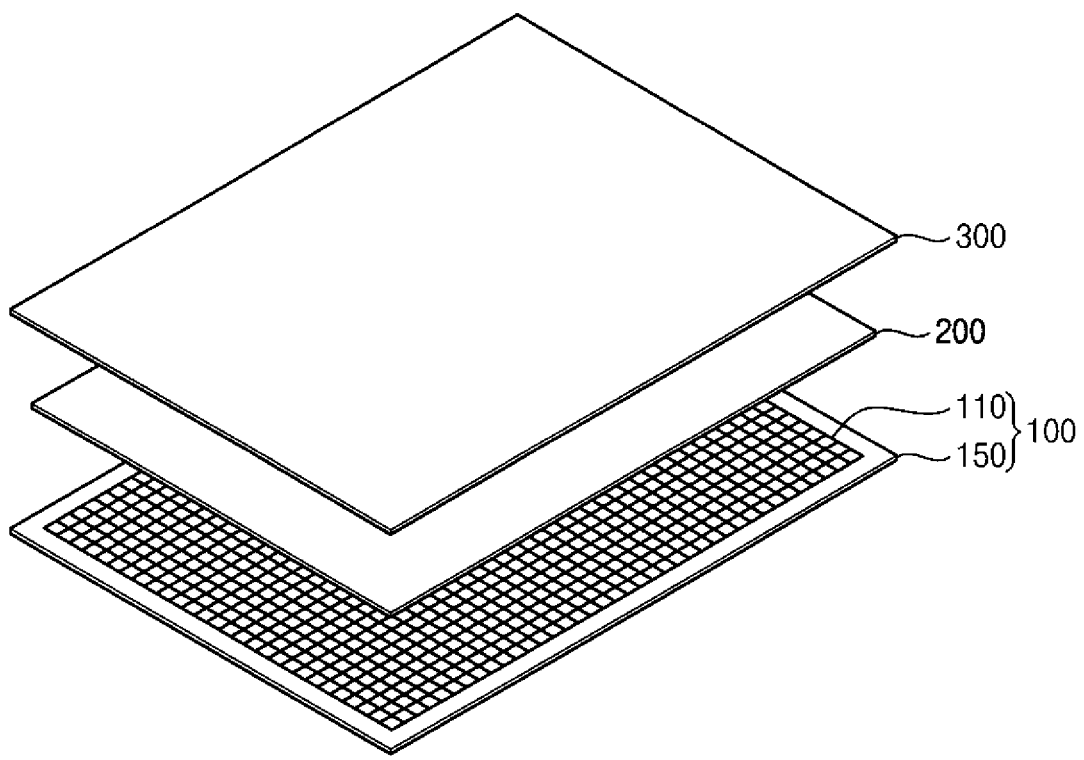
FIG. 1 is a perspective view illustrating an exemplary embodiment of a display panel according to the invention.

It will be understood that when an element or layer is referred to as being "on" or "coupled to" another element or layer, the element or layer can be directly on or connected to another element or layer or intervening elements or layers. In contrast, when an element is referred to as being "directly on" or "directly connected to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

Figure 2:
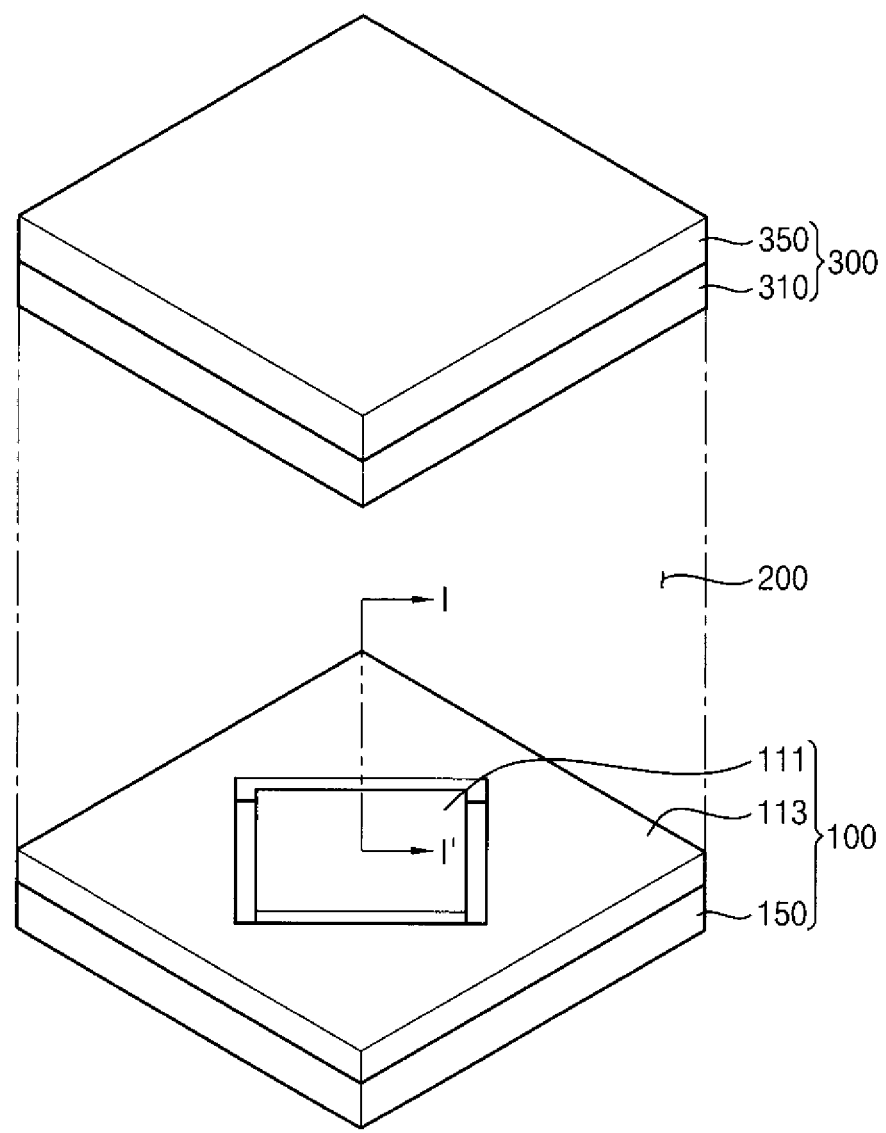
FIG. 2 is a perspective view illustrating an exemplary embodiment of a unit pixel of a display panel according to the invention.

FIG. 1 is a perspective view illustrating an exemplary embodiment of a display panel according to the invention. FIG. 2 is a perspective view illustrating an exemplary embodiment of a unit pixel according to the invention.

Referring to FIG. 1, the display panel includes a first substrate 300, a second substrate 100 and a liquid crystal layer 200 disposed between the first substrate 300 and a second substrate 100. The first substrate 300 may include a common electrode (not shown). The second substrate 100 may include a pixel electrode (not shown). An electric field between the common electrode and the pixel electrode may control a transmittance of liquid crystal of the liquid crystal layer 200. The second substrate 100 includes one or more unit pixels. The one or more unit pixels are on a display area of the second substrate 100. With a plurality of unit pixels, each unit pixel displays a portion of an image, so that the display panel may display the image.

Referring to FIG. 2, the unit pixel of the display includes the first substrate 300, the second substrate 100 and the liquid crystal layer 200. The first substrate 300 includes a first base substrate 350, and a common electrode 310 disposed on the first base substrate 350. The second substrate 100 includes a second base substrate 150, a first solid pixel electrode 111 on the second substrate 100 and a second solid pixel electrode 113 on the second substrate 100.

The first solid pixel electrode 111 and the second solid pixel electrode 113 are board-shaped or plate-shaped, and do not include an opening, such as in a slit shape, defined therein. The second solid pixel electrode 113 is spaced apart from the first solid pixel electrode 111. In a plan view, the second solid pixel electrode 113 surrounds the first solid pixel electrode 111, such as completely surrounding and enclosing the first solid pixel electrode 111. The first solid pixel electrode 111 is disposed on a central portion of the unit pixel. The second solid pixel electrode 113 is disposed on a peripheral area of the unit pixel. The first and/or second solid pixel electrode 111 and 113 may be a continuous, single, unitary, indivisible member, but is not limited thereto or thereby.

Figure 3:
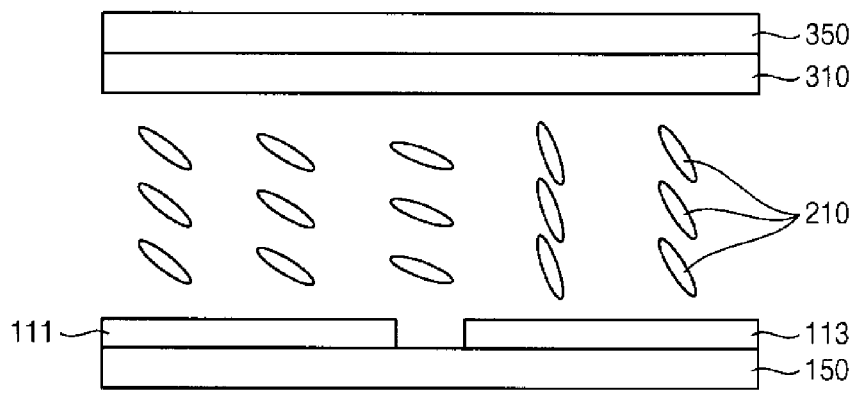
FIG. 3 is a cross-sectional view taken along line I-I' of FIG. 2.

FIG. 3 is a cross-sectional view taken along line I-I' of FIG. 2.

Referring to FIG. 3, the electric field respectively formed by the common electrode 310, in cooperation with the first solid pixel electrode 111 and the second solid pixel electrode 113, controls an arrangement of liquid crystal molecules 210 in a liquid crystal layer. Generally, an electric field is formed by one common electrode and one pixel electrode to control the liquid crystal molecules. However, in the illustrated exemplary embodiment, an electric field is formed by the one common electrode 310 and the first solid pixel electrode 111, and an electric field is also formed by the same one common electrode 310 and the second solid pixel electrode 113.

When the electric field is formed between the common electrode 310 and the first solid pixel electrode 111, the liquid crystal molecules are arranged toward a central portion of the unit pixel. When the electric field is formed between the common electrode 310 and the second solid pixel electrode 113, the liquid crystal molecules between the common electrode 310 and the second solid pixel electrode 113 are also arranged toward the central portion of the unit pixel due to the electric field formed between the common electrode 310 and the first solid pixel electrode 111. Thus, all liquid crystal molecules 210 in the unit pixel are arranged toward the central portion of the unit pixel.

Figure 4:
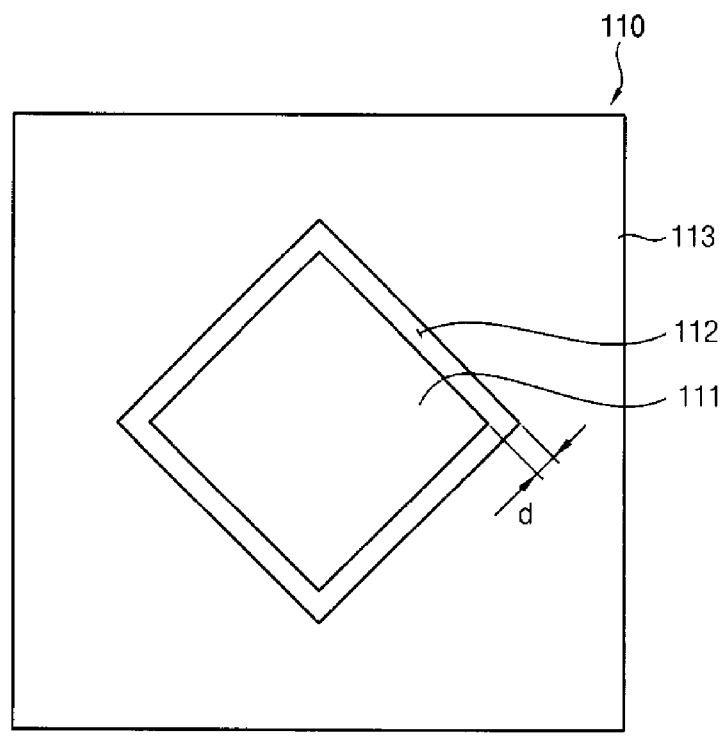
FIG. 4 is a plan view illustrating the unit pixel of FIG. 2.

FIG. 4 is a plan view illustrating the unit pixel of FIG. 2.

Referring to FIG. 4, a pixel electrode 110 of a unit pixel includes the first solid pixel electrode 111, and the second solid pixel electrode 113. The first solid pixel electrode 111 and the second solid pixel electrode 113 are board-shaped or plate-shaped, and do not include an opening or a slit defined therein. The first solid pixel electrode 111 and the second solid pixel electrode 113 are spaced apart each other by a pixel gap 112. The pixel gap 112 may define a distance d between the spaced apart first and second solid pixel electrodes 111 and 113. The distance d may be taken perpendicular to a longitudinal axis of a respective portion of the pixel gap 112, and may be otherwise referred to as a width of the pixel gap 112.

The first solid pixel electrode 111 is in a central portion of the pixel electrode 110. The second solid pixel electrode 113 is in a peripheral area of the pixel electrode 110. The second solid pixel electrode 113 surrounds the first solid pixel electrode 111. The first solid pixel electrode 111 may be rhombus-shaped, but is not limited thereto or thereby. The first solid pixel electrode 111 may be square-shaped in a unit pixel, but is not limited thereto or thereby. When the first solid pixel electrode 111 is rhombus-shaped, each apex of the first solid pixel electrode 111 respectively faces a center of a side of a tetragonal-shaped pixel electrode 110. Where the unit pixel as including the pixel electrode 110 is considered tetragonal-shaped, each of the apexes of the rhombus-shaped first solid pixel electrode 111 respectively faces a center of a side of the tetragonal-shaped unit pixel. Thus, the first solid pixel electrode 111 is symmetric with respect to a center of the pixel electrode 110 and/or a center of the unit pixel.

Figure 5:
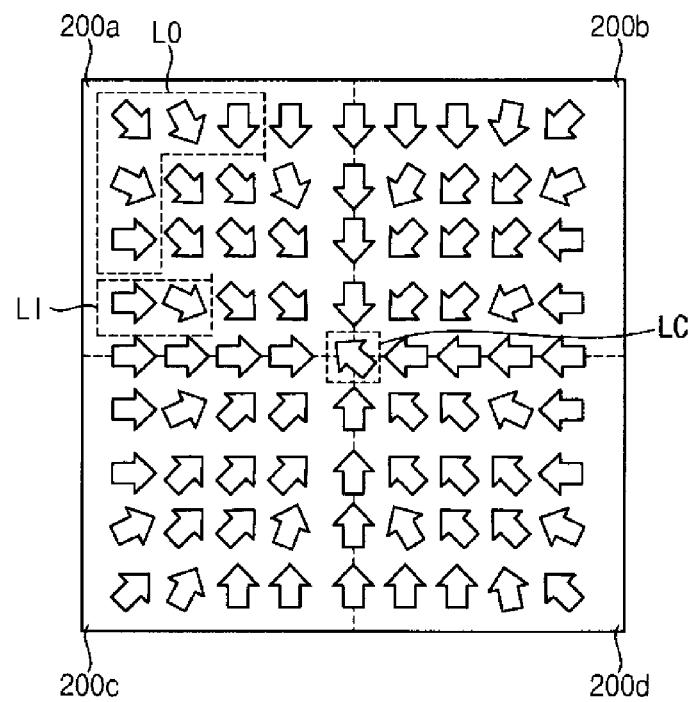
FIG. 5 is a plan view illustrating an arrangement of liquid crystal with respect to the unit pixel of FIG. 2.

FIG. 5 is a plan view illustrating an arrangement of liquid crystal with respect to the unit pixel of FIG. 2

Referring to FIG. 5, in a display panel including the unit pixel of FIG. 2, arrangement of liquid crystal in the unit pixel includes four domains 200a, 200b, 200c and 200d. The arrangement of liquid crystal in each of the four domains 200a, 200b, 200c and 200d is directed toward a center of the unit pixel as indicated by the arrows. Arrangement of liquid crystal or arrangement of liquid crystal molecules may be interchangeably used herein.

In general, liquid crystal molecules are arranged toward the center of the unit pixel. In each of the domains 200a, 200b, 200c and 200d, arrangements of the liquid crystal molecules are different from each other. Thus, the domains 200a, 200b, 200c and 200d have arrangements of liquid crystal molecules different from each other. Each of the domains 200a, 200b, 200c and 200d has an arrangement of liquid crystal molecules different from that of other domains, so that a viewing angle of the display panel may be improved. In addition, the arrangements of liquid crystal molecules different from each other may be formed by only two electrodes, that is, the first solid pixel electrode and the second solid pixel electrode, in cooperation with the common electrode 310.

Referring to FIG. 5 again, liquid crystal LO disposed adjacent to an edge of the second solid pixel electrode 113, such as adjacent to the outer edge, is influenced by the electric field formed at the edge of the second solid pixel electrode 113. Liquid crystal LI disposed in an interface of the domains is influenced by the electric field formed between the first and second solid pixel electrodes 111 and 113. Thus, an arrangement of liquid crystal molecules (for example LO and LI) in a same domain (for example 200*a*) may be non-uniform and different from each other.

Especially, liquid crystal LC in a central portion of a unit pixel may be tilted to a specific direction, instead of being toward a center of the unit pixel, due to a distortion of the electric field. This may decrease uniformity of an arrangement of liquid crystal molecules in each domain 200*a*, 200*b*, 200*c* and 200*d*.

Figure 6:
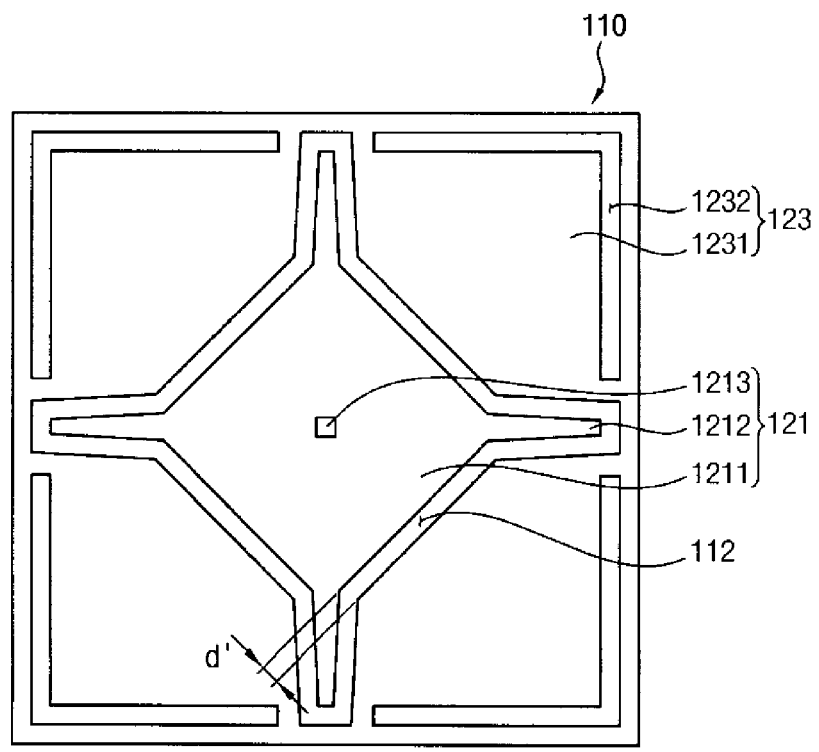
FIG. 6 is a plan view illustrating another exemplary embodiment of a unit pixel of a display panel according to the invention.

FIG. 6 is a plan view illustrating another exemplary embodiment of a unit pixel of a display panel according to the invention.

Referring to FIG. 6, a pixel electrode 110 of a display panel includes a first solid pixel electrode 121 and a second solid pixel electrode 123. The first solid pixel electrode 121 and the second solid pixel electrode 123 are spaced apart from each other by a pixel gap 112. The pixel gap 112 may define a distance d' between the spaced apart first and second solid pixel electrodes 121 and 123. The distance d' may be taken perpendicular to a longitudinal axis of a respective portion of the pixel gap 112, and may be otherwise referred to as a width of the pixel gap 112. The first solid pixel electrode 121 is disposed in a central area of the pixel electrode 110. The second solid pixel electrode 123 is disposed in a peripheral area of the pixel electrode 110.

The first solid pixel electrode 121 includes a body portion 1211, an extension portion 1212 and a central controlling portion 1213. The body portion 1211 is rhombus-shaped in the plan view.

The extension portion 1212 extends from each apex of the rhombus-shaped body portion 1211. The extension portion 1212 is extended from the body portion 1211 along a boundary of a domain of the unit pixel. The extension portion 1212 may be symmetric with reference to a center of the first solid pixel electrode 121. The extension portion 1212 may be extended from each of four apexes of the rhombus-shaped body portion 1211, so that four extension portions 1212 of the first solid pixel electrode 121 may be in the unit pixel. The pixel gap 112 may correspond to the profile of the first solid pixel electrode 121 and be parallel to edges thereof.

The central controlling portion 1213 is at the center of the body portion 1211. The central controlling portion 1213 may reduce or effectively prevent unwanted liquid crystal arrangement in the central portion of the first solid pixel electrode 121. The central controlling portion 1213 may be an opening defined in the body portion 1211, at center of the body portion 1211. The opening may be circular-shaped, quadrangular-shaped, etc. in the plan view, but is not limited thereto or thereby. When the central controlling portion 1213 is an opening, the electric field corresponding to the central controlling portion 1213 is canceled or negated, so that liquid crystal corresponding to the central controlling portion 1213 may not lean or tilt to a specific direction. Thus, unwanted liquid crystal arrangement in the central portion of the unit pixel may be reduced or effectively prevented.

In addition, the second solid pixel electrode 123 includes a body portion 1231 and a peripheral controlling portion 1232.

The body portion 1231 surrounds the first solid pixel electrode 121, and is spaced apart from the first solid pixel electrode 121 by the pixel gap 112. The body portion 1231 may be plate-shaped, such as tetragonal-shaped.

The peripheral controlling portion 1232 may be extended along an edge of the unit pixel, such as an outer edge thereof. The peripheral controlling portion 1232 may be extended along an edge of the second solid pixel electrode 123, and spaced apart from an outer edge of the second solid pixel electrode 123 by a specific distance. The peripheral controlling portion 1232 may be an opening defined in the body portion 1231 and extend along the outer edge of the second solid pixel electrode 123. When the peripheral controlling portion 1232 is the opening, the electric field formed at the outer edge of the unit pixel may be canceled or negated by the electric field formed at the peripheral controlling portion 1232, because a direction of the electric field formed at the peripheral controlling portion 1232 is opposite to a direction of the electric flied formed at the edge of the unit pixel. Thus, liquid crystal molecules may be directed toward the central portion of the unit pixel.

Figure 7:
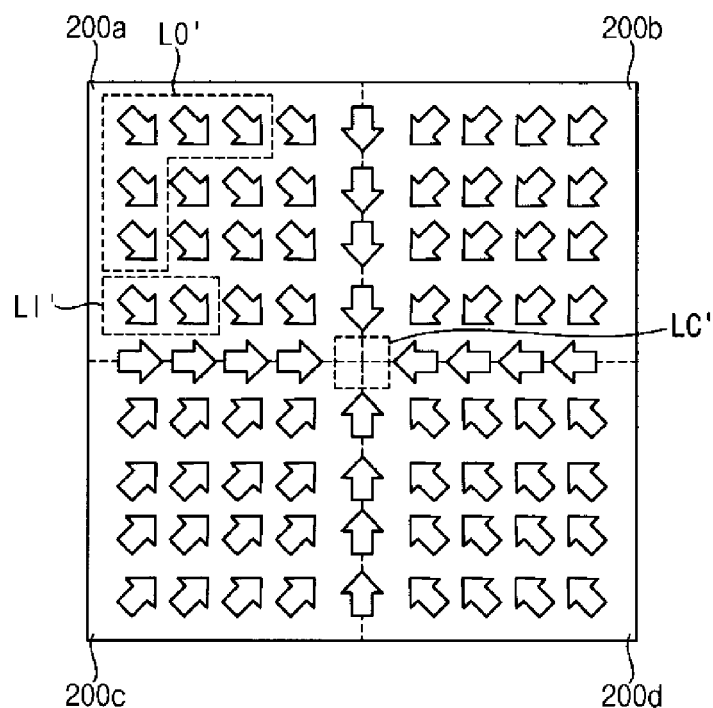
FIG. 7 is a plan view illustrating an arrangement of liquid crystal with respect to the unit pixel of FIG. 6.

FIG. 7 is a plan view illustrating an arrangement of liquid crystal with respect to the unit pixel of FIG. 6.

Referring to FIG. 7, an arrangement of liquid crystal is uniform in each domain 200*a*, 200*b*, 200*c* and 200*d*. In contrast to the exemplary embodiment of FIG. 5, arrangement of liquid crystal in each domain 200*a*, 200*b*, 200*c* and 200*d* according to the exemplary embodiment in FIG. 7 is regular and uniform.

Liquid crystal LI' disposed in an interface of the domains is controlled by the extension portion 1212 of the first solid pixel electrode 121. Thus, liquid crystal molecules of the liquid crystal LI' may be arranged in a same direction as that of other liquid crystal molecules in a same domain.

Liquid crystal LO' disposed adjacent to an edge of the second solid pixel electrode 123 is controlled by the peripheral controlling portion 1232, so that the liquid crystal LO' may not be influenced by the electric field formed at the edge of the unit pixel. Thus, liquid crystal molecules of the liquid crystal LO' may be arranged in a same direction as that of other liquid crystal molecules in a same domain.

Liquid crystal LC' disposed at the central portion of the unit pixel is controlled by the central controlling portion 1213. Thus, liquid crystal molecules of the liquid crystal LC' disposed at the central portion of the unit pixel may not lean or tilt to a specific direction.

Thus, arrangement of liquid crystal in each domain 200*a*, 200*b*, 200*c* and 200*d* may be regular and uniform.

Figure 8A:
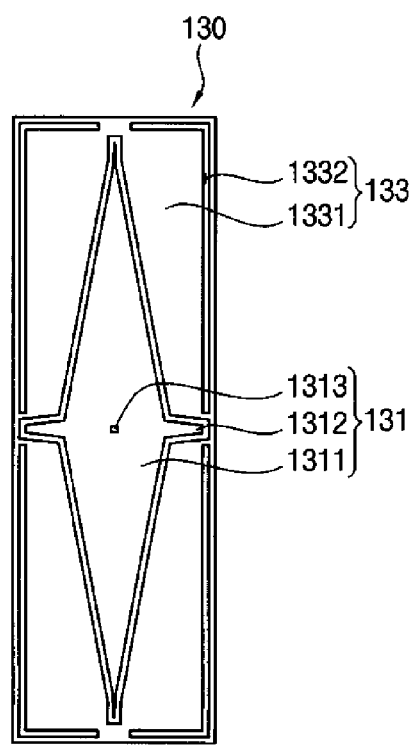
FIGS. 8A to 8C are plan views illustrating still other exemplary embodiments of a unit pixel of a display panel according to the invention.
Figure 8B:
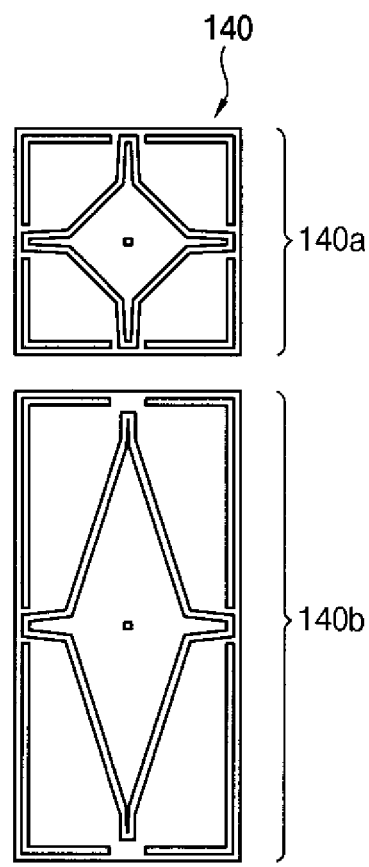
Figure 8C:
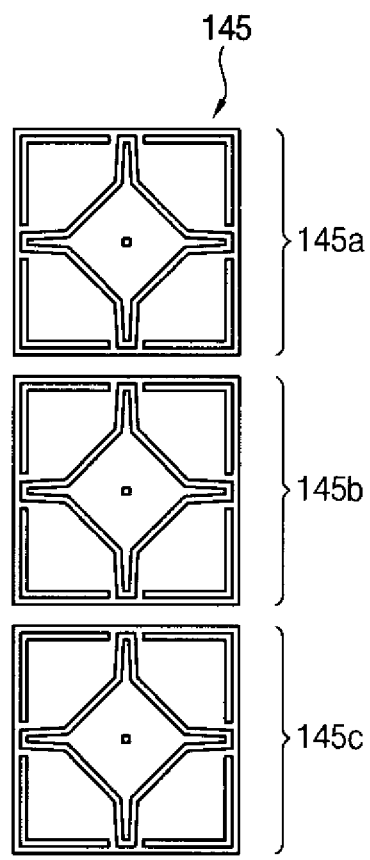

FIGS. 8A to 8C are plan views illustrating still other exemplary embodiments of a unit pixel of a display panel according to the invention.

Although the above-described exemplary embodiments of a unit pixel are square-shaped, alternatively, the unit pixel may have various shapes. Many modifications of the unit pixel having a first solid pixel electrode and a second pixel electrode may be possible.

Referring to FIG. 8A, the pixel electrode 130 has a longitudinal axis which extends from top to bottom and is overall rectangular-shaped. The pixel electrode 130 includes a first solid pixel electrode 131 and a second solid pixel electrode 133, similar to the exemplary embodiment of FIG. 6. The first solid pixel electrode 131 includes a body portion 1311, an extension portion 1312 and a central controlling portion 1313. The second solid pixel electrode 133 includes a body portion 1331 and a peripheral controlling portion 1332. A function of the pixel electrode 130 may be same as that of the pixel electrode 110 in FIG. 6.

Referring to FIG. 8B, a collective pixel electrode 140 may include a plurality of pixel electrodes, such as a first pixel electrode 140a and a second pixel electrode 140b. The first and second pixel electrodes 140a and 140b may form a unit pixel electrode 140. Each of the pixel electrodes 140a and 140b of the pixel electrode 140 is substantially same as the pixel electrode 110 of FIG. 6, except that the first pixel electrode 140a is square-shaped, and the second pixel electrode 140b is rectangular-shaped. The first and second pixel electrodes 140a and 140b may be arranged adjacent to each other along a longitudinal axis of a unit pixel, but are not limited thereto or thereby.

Referring to FIG. 8C, a collective pixel electrode 145 includes a plurality of pixel electrodes, such as a first pixel electrode 145a, a second pixel electrode 145b and a third pixel electrode 145c. Each of the first to third pixel electrodes 145a, 145b and 145c is square-shaped. The first to third pixel electrodes 145a, 145b and 145c form a unit pixel electrode 145. Functions of the each of the first to third pixel electrodes 145a, 145b and 145c in FIG. 8C may be same as that of pixel electrode 110 of FIG. 6.

Figure 9A:
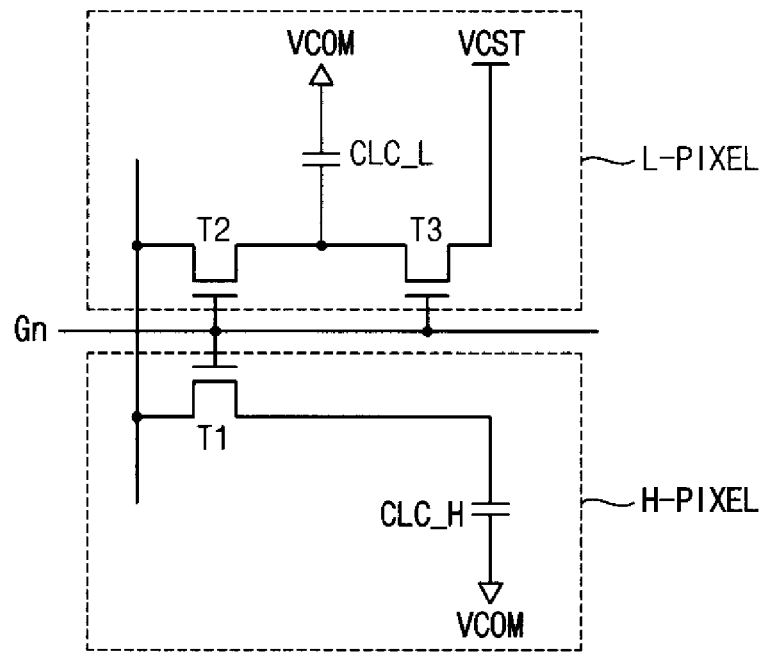
FIGS. 9A and 9B are circuit diagrams illustrating yet another exemplary embodiment of a unit pixel according to the invention.
Figure 9B:
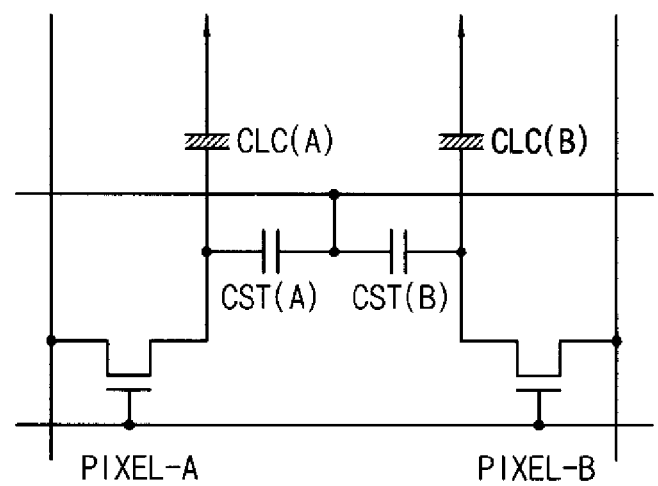

FIGS. 9A and 9B are circuit diagram illustrating yet another exemplary embodiment of a unit pixel according to the invention.

Two voltages may be applied to the first solid pixel electrode and the second solid pixel electrode, respectively. To drive the pixel electrode including the first solid pixel electrode and the second solid pixel electrode, one gate line and one data line for one pixel ("1G1D") or one gate line and two data lines ("1G2D") may be used.

Referring to FIG. 9A, a circuit using one gate line and one data line for one pixel ("1G1D") is used to apply different voltages to the first and second solid pixel electrodes.

In the illustrated exemplary embodiment, a gate open (Von) voltage is applied from one gate line Gn through switching elements T1, T2 and T2, each data signal from one data line is applied, and then the electrode voltage L-Pixel corresponding to the second solid pixel electrode is controlled using additional Vcst voltage and liquid crystal capacitors CLC-L and CLC_H. An electrode voltage H-Pixel corresponding to the first solid pixel is applied.

Thus, two voltages different from each other may be applied to the first solid pixel electrode and the second solid pixel electrode, respectively.

Referring to FIG. 9B, a circuit using one gate line and two data line for one pixel ("1G2D") is used to apply different voltages to the first and second solid pixel electrodes. Each pixel electrode is connected to a distinct data line, so that voltage may be applied using distinct switching elements. A first switching element PIXEL-A corresponding to the first solid pixel electrode, and a second switching element PIXEL-B corresponding to the second solid pixel electrode are respectively driven to apply the voltages to the respective solid pixel electrode. The voltages are controlled using liquid crystal capacitors CLC(A) and CLC(B), and storage capacitors CST(A) and CST(B) connected to a storage electrode line.

In an exemplary embodiment, a method of manufacturing a display panel includes forming (e.g., providing) a common electrode on a first substrate, forming one or more pixel electrodes on a second substrate to form a unit pixel, injecting liquid crystal, and pre-tilting the liquid crystal. The unit pixel includes a first solid pixel electrode and a second solid pixel electrode. The second solid pixel electrode is spaced apart from the first solid pixel electrode and surrounds the first solid pixel electrode. The first solid pixel electrode and the second solid pixel may include a same material, and may be formed from a same layer of the display panel. The first solid pixel electrode and the second solid pixel may also be considered in or on a same layer of the display panel. A typical method of manufacturing a display panel including forming the common electrode and forming the pixel electrode on a substrate may be used. However, when the unit pixel includes two pixel electrodes and/or two pixel regions, in an operation for pre-tilting of the liquid crystal, a specific manufacturing process may be selected.

Figure 10A:
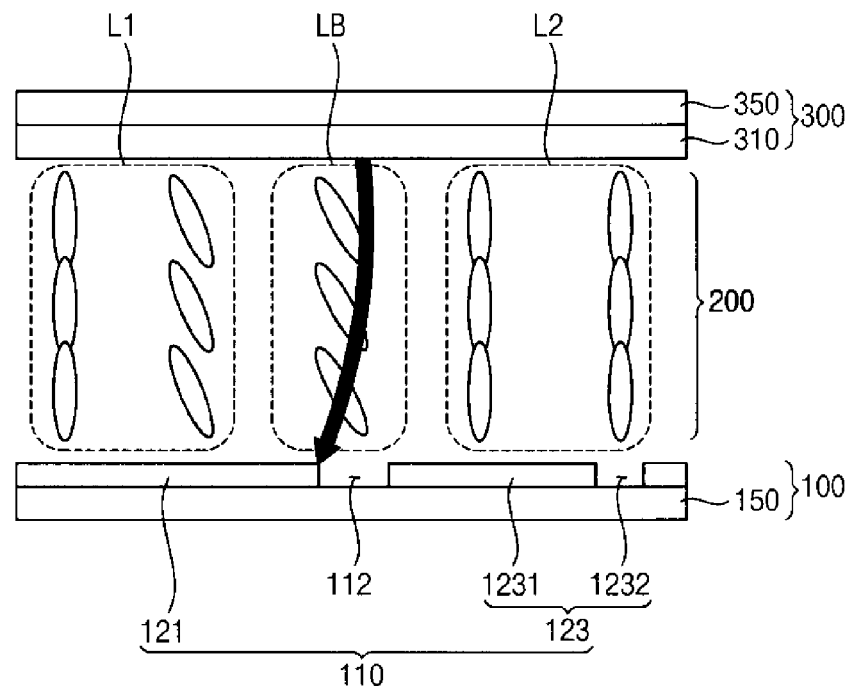
FIGS. 10A and 10B are cross-sectional views illustrating an exemplary embodiment of forming liquid crystal having a pre-tilt according to the invention.
Figure 10B:
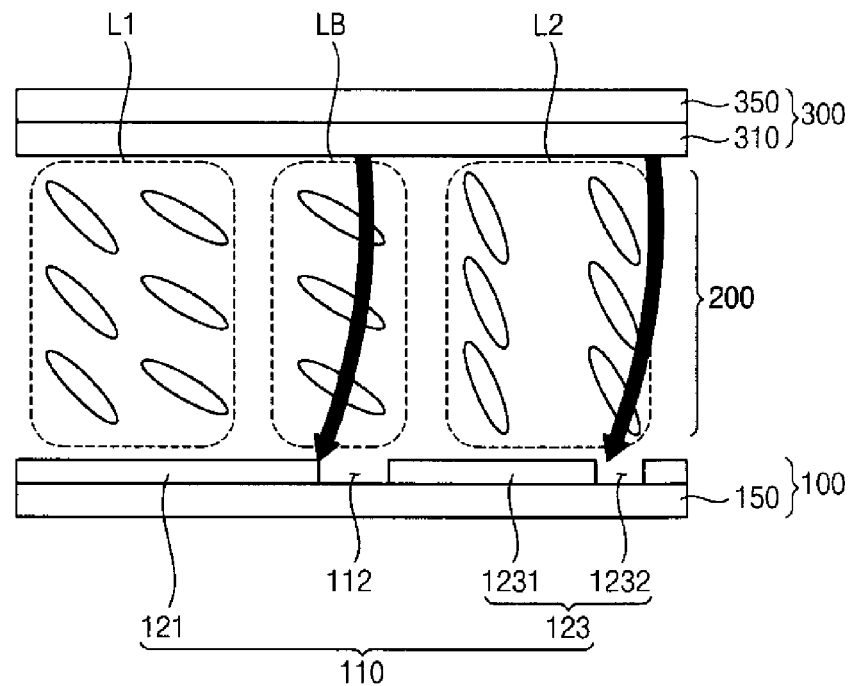

FIGS. 10A and 10B are cross-sectional views illustrating an exemplary embodiment of forming liquid crystal having a pre-tilt according to the invention.

Referring to FIG. 10A and 10B, a method of manufacturing a pre-tilt includes pre-tilting liquid crystal on a first solid pixel electrode (first pre-tilt forming operation) and pre-tilting liquid crystal on a second solid pixel electrode (second pre-tilt forming operation). In exemplary embodiments of the invention, one unit pixel includes solid pixel electrodes having different shapes from each other. Arrangement of liquid crystal molecules of the liquid crystal may be toward a center portion of the unit pixel.

Thus, after the first pre-tilt forming operation, the second pre-tilt forming operation may be processed, so that liquid crystal on the first solid pixel electrode may influence the pre-tilt of liquid crystal on the second pixel electrode.

In the first pre-tilt forming operation, a voltage is applied to the first solid pixel electrode to pre-tilt liquid crystal. The pre-tilted liquid crystal may be formed by various methods. In one exemplary embodiment, for example, in a process of injecting liquid crystal, light-curing material may be mixed with the liquid crystal. The light-curing material may be reactive mesogen ("RM"). The light-curing material is injected, and a voltage is applied to a common electrode and the first solid pixel electrode, so that liquid crystal on the first solid pixel electrode is tilted toward a center of a pixel electrode including the first solid pixel electrode. After that, specific light such as ultraviolet rays is irradiated to the liquid crystal mixed with the light curing-material. Due to the irradiated light, the light-curing material in the liquid crystal is hardened, so that pre-tilted liquid crystal may be formed.

In addition or alternatively, a RM alignment layer may be used. The RM alignment layer tilts or inclines liquid crystal molecules on the RM alignment layer according to a direction of light irradiation. The molecules which are inclined may form the pre-tilted liquid crystal. The pre-tilt of the liquid crystal may be formed by light irradiation without applying of a voltage. Thus, the pre-tilt of liquid crystal may be formed by controlling a direction of light irradiation without applying voltage to the common electrode and the first solid pixel electrode.

Referring to FIG. 10A again, a common voltage Vcom is applied to the common electrode 310 of the first substrate 300, and a voltage is applied to a first solid pixel electrode 121 of the second substrate 100 to form an electric field therebetween as shown by the arrow, so that liquid crystal LB disposed at a boundary of the first solid pixel electrode 121 may be arranged. A portion of liquid crystal L1 on the first solid pixel electrode 121 may be influenced by the electric field and/or the tilted liquid crystal LB, so that the portion of the liquid crystal L1 may be tilted toward the center of the pixel electrode 110. With the liquid crystal LB and L1 arranged and tilted as described above, light is irradiated to the liquid crystal layer 200 to form the pre-tilted liquid crystal of the first pre-tilt forming operation.

In the second pre-tilt forming operation, a voltage, which is lower than a voltage applied to the first solid pixel electrode 121, is applied to the second solid pixel electrode 123 to form pre-tilted liquid crystal. Forming the pre-tilt in the first pre-tilt forming operation may be substantially same as that of the first pre-tilt forming operation. A difference between the first pre-tilt forming operation and the second pre-tilt forming operation is applying the voltage to the second solid pixel electrode. A voltage is applied the first solid pixel electrode 121, and a voltage, which is lower than a voltage applied to the first solid pixel electrode 121, is applied to the second solid pixel electrode 123. An electric field formed between the second solid pixel electrode 123 and the common electrode 310, and tilted liquid crystal on the first solid pixel electrode 121 both influence liquid crystal on the second solid pixel electrode 123, so that liquid crystal on the second solid pixel electrode 123 is arranged. After that, specific light such as ultraviolet rays is irradiated to the liquid crystal. Due to the light, the light-curing material in the liquid crystal is hardened, so that pre-tilted liquid crystal may be formed.

Referring to FIG. 10B again, a common voltage Vcom is applied to the common electrode 310 of the first substrate 300 and voltages are applied to the first solid pixel electrode 121 and the second solid pixel electrode 123 of the second substrate 100 to form respective electric fields therebetween, so that liquid crystal LB disposed at a boundary of the first solid pixel electrode 121 and liquid crystal L2 disposed at an edge of the second solid pixel electrode 123 may be arranged. By the peripheral controlling portion 1232 adjacent to outer boundaries of the second solid pixel electrode 123, the arrangement of liquid crystal L2 may be regular and uniform.

Accordingly, liquid crystal L2 on the second solid pixel electrode 123 is tilted toward the center of the pixel electrode. With the liquid crystal L2 tilted, light is irradiated to form the pre-tilt.

Figure 11:
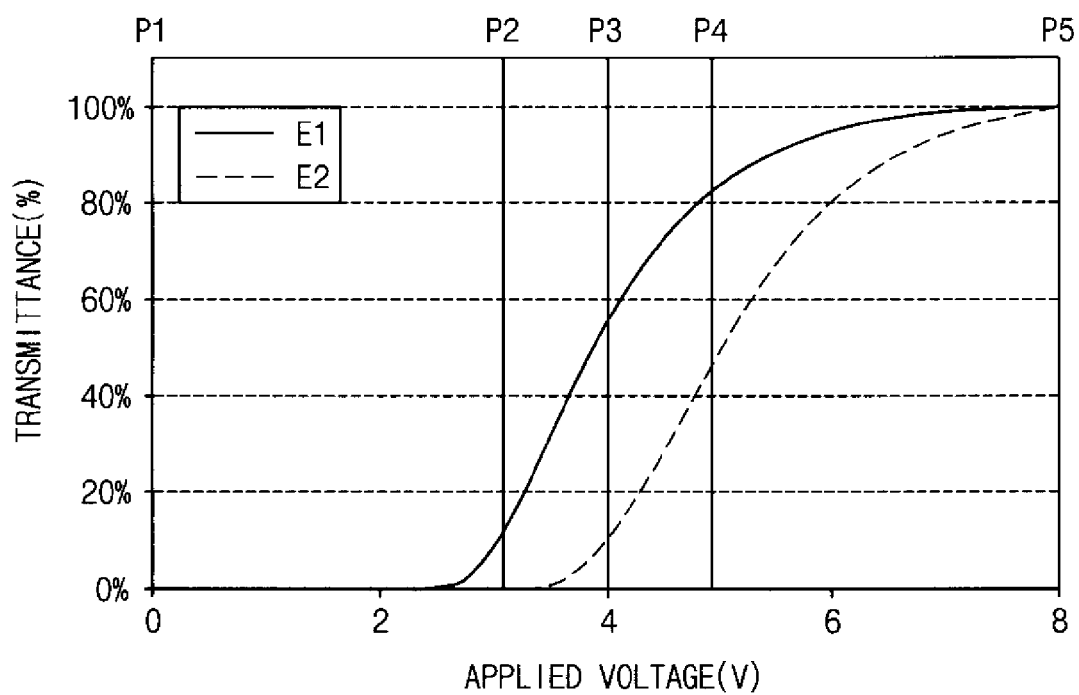
FIG. 11 is a graph illustrating a transmittance in percent (%) of a display panel in accordance with an applied voltage in volts (V), of an exemplary embodiment of a display panel according to the invention.

FIG. 11 is a graph illustrating a transmittance in percent (%) of a display panel in accordance with an applied voltage in volts (V), of an exemplary embodiment of the display panel according to the invention.

Referring to FIG. 11, transmittance E1 of liquid crystal on the first solid pixel electrode is different from transmittance E2 of liquid crystal on the second solid pixel electrode due to applied voltages. The pre-tilt of the liquid crystal is formed by voltages different from each other, so that transmittances of the liquid crystal are differently distributed. If same voltage is applied, then transmittance E1 of liquid crystal on the first solid pixel electrode is relatively higher and reaches a maximum transmittance (100%) faster than when the different voltages applied.

FIGS. 12A to 12E are photographs illustrating a transmittance of a unit pixel represented in FIG. 11.

Figure 12A:
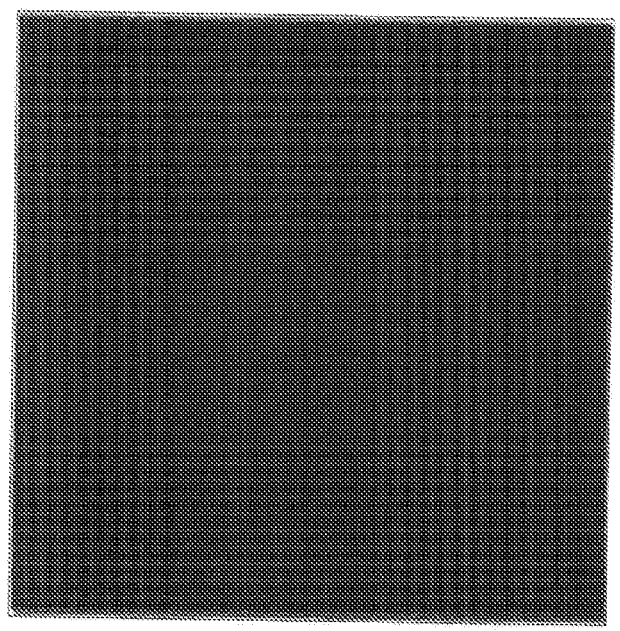
FIGS. 12A to 12E are photographs illustrating the transmittance of a unit pixel represented in FIG. 11.
Figure 12B:
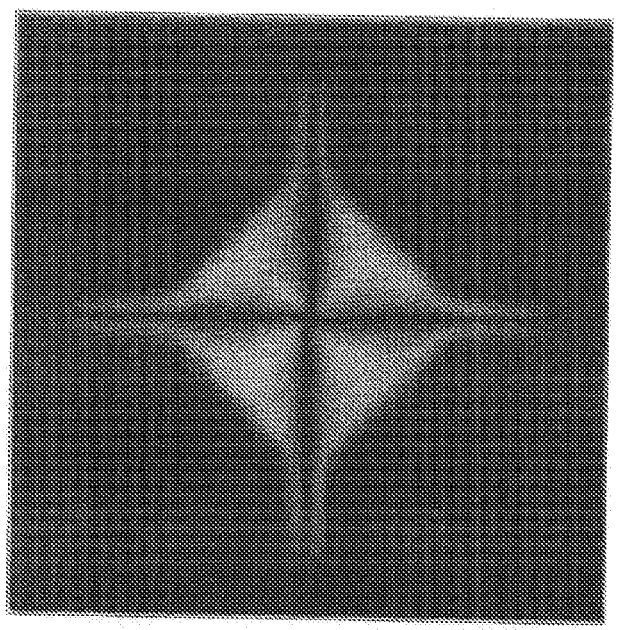
Figure 12C:
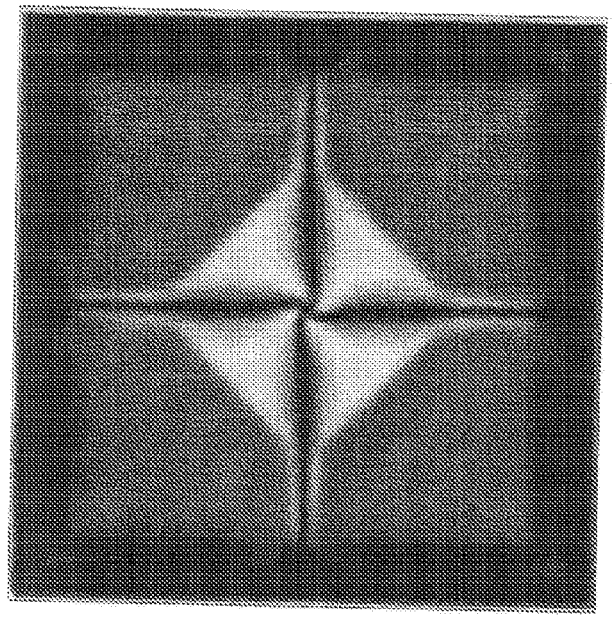
Figure 12D:
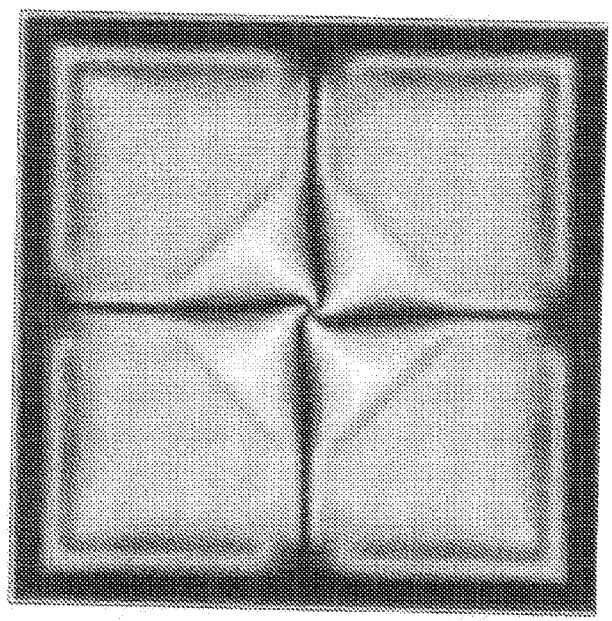
Figure 12E:
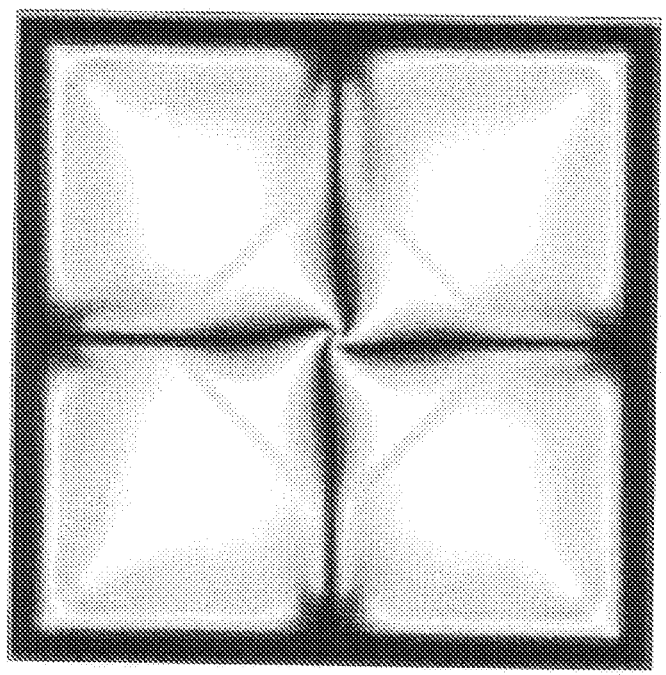

Referring to FIGS. 12A to 12E, the photographs show transmittance distributions of the unit pixel according to applied voltages of FIG. 11. FIG. 12A is a transmittance distribution of the unit pixel when a voltage corresponding to a first position P1 of FIG. 11 is applied. FIG. 12B is a transmittance distribution of the unit pixel when a voltage corresponding to a second position P2 of FIG. 11 is applied. FIG. 12C is a transmittance distribution of the unit pixel when a voltage corresponding to a third position P3 of FIG. 11 is applied. FIG. 12D is a transmittance distribution of the unit pixel when a voltage corresponding to a fourth position P4 of FIG. 11 is applied. FIG. 12E is a transmittance distribution of the unit pixel when a voltage corresponding to a fifth position P5 of FIG. 11 is applied.

As shown in FIGS. 12A to 12E, the unit pixel includes four domains each having a transmittance distribution. Differences in the transmittance difference are caused by different applied voltages.

Figure 13A:
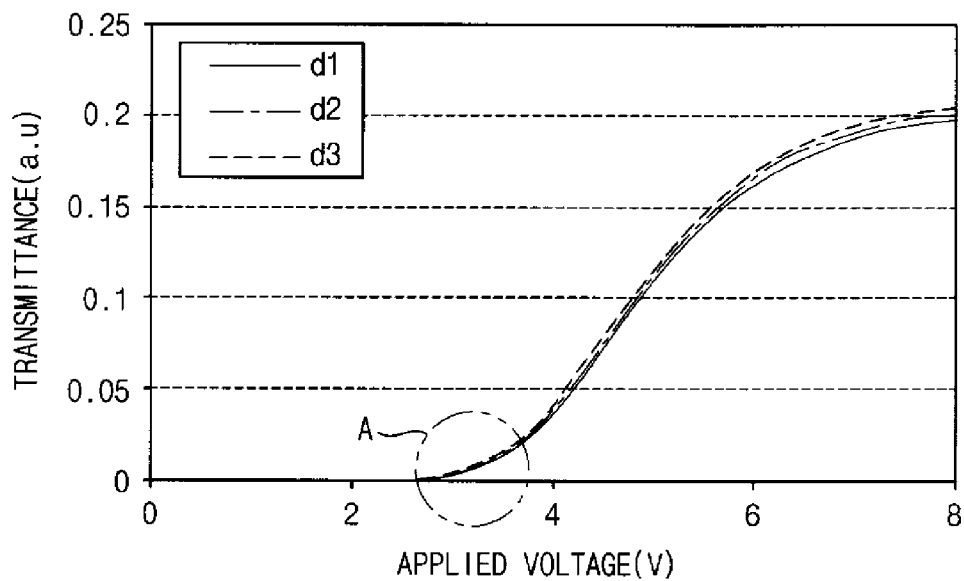
FIGS. 13A and 13B are graphs illustrating a transmittance difference in arbitrary units (a.u.) in accordance with an applied voltage in volts (V), with respect to a gap between solid pixel electrodes.
Figure 13B:
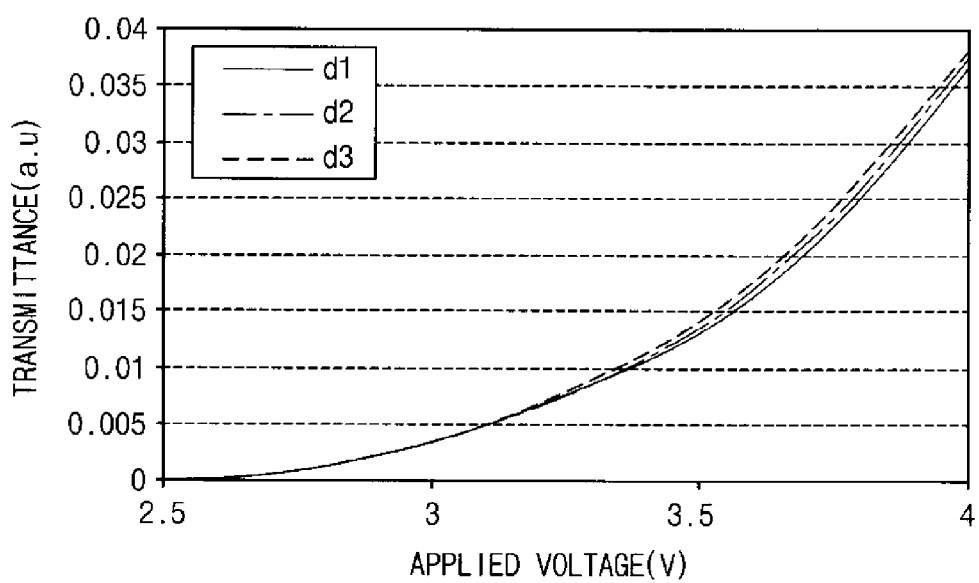

FIGS. 13A and 13B are graphs illustrating a transmittance difference in arbitrary units (a.u.) in accordance with an applied voltage in volts (V), with respect to a gap between solid pixel electrodes.

Referring to FIG. 13A, differences in transmittance occur when an error in the pixel gap between the first solid pixel electrode and the second solid pixel electrode occurs, relating to a reference value of the pixel gap. A first width d1 of the pixel gap is 0.1 micrometer (μm) smaller than the reference value, a second width d2 of the pixel gap is same as the reference value, and a third width d3 of the pixel gap is 0.1 μm larger than the reference value. A deviation from the reference value may be considered an error in the pixel gap. As shown in FIG. 13A, although the error in the pixel gap is made, transmittance may hardly be influenced.

FIG. 13B is a graph showing transmittance difference in region A of FIG. 13A.

Referring to FIG. 13B, although the error in the pixel gap is made especially while the transmittance changes from 0 to positive value, the transmittance may hardly be influenced by the error. Thus, if an error in pixel gap is made during a manufacturing process, transmittance of the pixel electrode may not be changed.

According to one or more exemplary embodiment of the invention, liquid crystal is arranged by an electric field formed between a common electrode and a first solid pixel electrode, an electric field formed between the common electrode and a second solid pixel electrode, and an electric field formed between the first solid pixel electrode and the second solid pixel electrode. Thus, if an error in a pixel gap between the first solid pixel electrode and the second solid pixel electrode is made, transmittance may hardly be influenced. Therefore, display quality of the one or more exemplary embodiment of the invention may be improved, as compared to a conventional pixel structure using a slit defined in a pixel electrode.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display panel comprising:
    a first substrate comprising a common electrode;
    a second substrate comprising a first solid pixel electrode, and a second solid pixel electrode spaced apart from the first solid pixel electrode, wherein the second solid pixel electrode surrounds the first solid pixel electrode; and
    a liquid crystal layer comprising liquid crystal between the first substrate and the second substrate, wherein
the first solid pixel electrode comprises a substantially rhombus-shape body portion, and a plurality of extension portions respectively extending from all apexes of the rhombus-shaped body portion, and
the second solid pixel electrode is spaced apart from the first solid pixel electrode including the plurality of extension portions, by a constant gap.

2. The display panel of claim 1, wherein the first solid pixel electrode is symmetric with respect to a center of the first solid pixel electrode.

3. The display panel of claim 1, wherein the extension portions are symmetric with respect to a center of the first solid pixel electrode.

4. The display panel of claim 1, wherein the first solid pixel electrode comprises four extension portions.

5. The display panel of claim 1, wherein the first solid pixel electrode further comprises a central controlling portion at a center of the first solid pixel electrode.

6. The display panel of claim 5, wherein the central controlling portion is an opening defined in the rhombus-shape body portion, at the center of the first solid pixel electrode.

7. The display panel of claim 1, wherein the second solid pixel electrode comprises a peripheral controlling portion extending along an outer edge of the second solid pixel electrode.

8. The display panel of claim 7, wherein the peripheral controlling portion is an opening defined in the second solid pixel electrode and extended along the outer edge of the second solid pixel electrode.

9. The display panel of claim 1, wherein the first solid pixel electrode and the second solid pixel electrode are in a same layer of the display panel.

10. The display panel of claim 1, wherein a pre-tilt of the liquid crystal on the first solid pixel electrode and a pre-tilt of the liquid crystal on the second solid pixel electrode are different from each other.

11. A method of manufacturing a display panel, the method comprising:
providing a common electrode on a first substrate;
providing a unit pixel comprising a first solid pixel electrode, and a second solid pixel electrode spaced apart from the first solid pixel electrode, on a second substrate, wherein the second solid pixel electrode surrounds the first solid pixel electrode;
providing a liquid crystal layer comprising liquid crystal between the first substrate and the second substrate; and
providing a pre-tilt of the liquid crystal,
wherein
the first solid pixel electrode comprises a substantially rhombus-shape body portion, and a plurality of extension portions respectively extending from all apexes of the rhombus-shaped body portion, and
the second solid pixel electrode is spaced apart from the first solid pixel electrode including the plurality of extension portions, by a constant gap.

12. The method of claim 11, wherein the pre-tilt of the liquid crystal on the first solid pixel electrode and the pre-tilt of the liquid crystal on the second solid pixel electrode are different from each other.

13. The method of claim 11, wherein the providing a pre-tilt of the liquid crystal comprises:
providing a first pre-tilt of the liquid crystal on the first solid pixel electrode; and
providing a second pre-tilt of the liquid crystal on the second solid pixel electrode.

14. The method of claim 13, wherein the providing a second pre-tilt is after the providing a first pre-tilt.

15. The method of claim 13, wherein the providing a first pre-tilt and providing a second pre-tilt comprises a photoreaction.

16. The method of claim 15, wherein the providing a first pre-tilt comprises:
applying a first voltage to the first solid pixel electrode.

17. The method of claim 16, wherein the providing a second pre-tilt comprises:
applying a second voltage to the second solid pixel electrode, wherein the second voltage is lower than the first voltage.

18. The method of claim 11, wherein the first solid pixel electrode further comprises a central controlling portion at a center of the first solid pixel electrode, and
the central controlling portion is an opening defined in the first solid pixel electrode at the center of the first solid pixel electrode.

19. The method of claim 11, wherein the second solid pixel electrode comprises a peripheral controlling portion which extends along an outer edge of the second solid pixel electrode, and
the peripheral controlling portion is an opening defined in the second solid pixel electrode and extending along the outer edge of the second solid pixel electrode.

* * * * *